US012793318B2

(12) United States Patent
Hsieh et al.

(10) Patent No.: US 12,793,318 B2
(45) Date of Patent: Nov. 10, 2026

(54) THREE-DIMENSIONAL MODEL RECONSTRUCTION AND RENDERING DEVICE

(71) Applicant: Morphusai Co., Ltd., Taipei (TW)

(72) Inventors: Chia-Chun Hsieh, Taichung (TW); Wei-Xiang Ni, New Taipei (TW)

(73) Assignee: MORPHUSAI CO., LTD., Taipei City (TW)

( * ) Notice: Subject to any disclaimer, the term of this patent is extended or adjusted under 35 U.S.C. 154(b) by 151 days.

(21) Appl. No.: 18/807,542

(22) Filed: Aug. 16, 2024

(65) Prior Publication Data

US 2025/0200861 A1 Jun. 19, 2025

(30) Foreign Application Priority Data

Dec. 19, 2023 (TW) ................................ 112149486

(51) Int. Cl.
*G06T 15/00* (2011.01)
*G06T 17/00* (2006.01)

(52) U.S. Cl.
CPC ............ *G06T 15/005* (2013.01); *G06T 15/00* (2013.01); *G06T 17/00* (2013.01)

(58) Field of Classification Search
CPC ........ G06T 17/00; G06T 15/005; G06T 15/00
See application file for complete search history.

(56) References Cited

U.S. PATENT DOCUMENTS

2015/0109415 A1* 4/2015 Son .......................... H04N 7/18 348/46
2018/0253894 A1* 9/2018 Krishnan ................ G06T 15/08
2022/0084282 A1* 3/2022 Araki ...................... G06T 11/10
2024/0135623 A1* 4/2024 Alimo ..................... G06T 15/00

FOREIGN PATENT DOCUMENTS

CN 116977525 A * 10/2023 ........... G06T 15/005
WO WO-2021191017 A1 * 9/2021 ............. G06T 19/20

OTHER PUBLICATIONS

A M Avramescu, "Special effects used in creating 3D animated scenes part 1," IOP Conference Series: Materials Science and Engineering, vol. 95, 2015 (Year: 2015).*

* cited by examiner

*Primary Examiner* — Devona E Faulk
*Assistant Examiner* — Erica G Therkorn
(74) *Attorney, Agent, or Firm* — Workman Nydegger

(57) ABSTRACT

The present invention proposes a three-dimensional (3D) model reconstruction and rendering device, which includes a data collection module for obtaining required data from two-dimensional images captured by different photographic equipment, a model training module configured to obtain data from the data collection module to train the 3D modeling model and learn the ability to reconstruct and render 3D models and scenes, a 3D model and scene rendering module utilizing the 3D modeling model completed with training to convert the collected data into three-dimensional models and scenes, and a rendering and 3D effect module being used to process the generated three-dimensional models and scenes through the three-dimensional modeling and rendering software for further applications.

9 Claims, 4 Drawing Sheets

THREE-DIMENSIONAL MODEL RECONSTRUCTION AND RENDERING DEVICE

TECHNICAL FIELD

The present invention relates to technology field of the reconstruction of three-dimensional (3D) scenes and objects, especially a device for three-dimensional (3D) model reconstruction and rendering.

BACKGROUND

Three-dimensional (3D) model reconstruction method is one of the popular areas in the field of computer vision. 3D model reconstruction is the process of recovering the three-dimensional coordinates of spatial points from the image. The purpose of 3D reconstruction of a scene is to utilize camera and other equipment to scan the scene and to generate an accurate and complete 3D model. The 3D reconstruction is a complex system that integrates scene scanning, data processing, scene modeling and other processes.

With nearly two to three decades of study, many 3D model reconstruction methods have been applied to various fields of virtual reality technologies, such as digital marketing, virtual tour guides, digital education, art product display, medical analogies, large-scale display systems, and teaching videos. These type of methods mainly include collecting two-dimensional (2D) data from the plane image of the actual object, obtaining the 3D data through some specific 3D data reconstruction calculations, and reconstructing the 3D computer model accordingly.

With the continuous advancement of computer vision and deep learning technologies, 3D model reconstruction and rendering technologies have been widely used in many fields. Especially in the fields of entertainment and business, high-quality 3D model and scene renderings can provide users with a more realistic and immersive experience. However, traditional 3D model reconstruction and scene rendering methods usually require a large amount of computing resources and expertise, and are difficult to handle high-resolution and large-scale data.

Recently, with the rapid improvement of computing capabilities of computer chip and breakthroughs in the field of deep learning, the 3D reconstruction combined with neural networks has become a research hotspot in computer graphics. This technology has great potential in many fields, such as augmented reality/virtual reality (AR/VR), remote conferencing, real-time live broadcast, and metaverse.

Therefore, it is needed to propose efficient device and related method for 3D model reconstruction and rendering by combining 3D reconstruction and rendering technology based on neural network architecture.

SUMMARY OF THE INVENTION

For the above purposes, a three-dimensional (3D) model reconstruction and rendering apparatus is provided, which includes a processor, a storage device couple to the processor, a data collection module, stored in the storage device and accessible through the processor, configured to obtain required data from two-dimensional (2D) images captured by different photographic equipment, a model training module, stored in the storage device and accessible through the processor, configured to obtain the required data from the data collection module to train a 3D modeling model and learn the ability of reconstructing and rendering 3D models and scenes, a 3D model and scene rendering module, stored in the storage device and accessible through the processor, utilizing the 3D modeling model that has been trained to convert the required data into 3D models and scenes, and a rendering and 3D effect module, stored in the storage device and accessible through the processor, configured to performed processing and post-production on the generated 3D models and scenes through a 3D modeling and rendering software.

In one preferred embodiment, the three-dimensional (3D) model reconstruction and rendering apparatus further includes a high-resolution reconstruction module, stored in the storage device and accessible through the processor, configured to produce high-resolution reconstruction from the generated 3D models and scenes.

In one preferred embodiment, the high-resolution reconstruction module reconstructs a 3D model with a resolution of up to 4K to meet the needs of high-resolution visual effects. The 3D modeling model is built in the model training module including a neural radiation field (NeRF) algorithm and a Gaussian Splatting algorithm. The NeRF algorithm is used to reconstruct high-quality 3D models from multi-view 2D images. The high-quality 3D models include people/objects and scenes. The Gaussian splattering algorithm is used to improve rendering effect of the 3D models and scenes. The 3D modeling and rendering software include Blender b3d, Maya and Unreal Engine.

In one preferred embodiment, the processor includes a multi-core central processing unit (CPU), a graphics processor unit (GPU), a digital signal processor (DSP), an application specific integrated circuit (ASIC), or their combinations.

In one preferred embodiment, the 3D model reconstruction and rendering apparatus configured to realize processes for reconstructing and rendering the 3D models and scenes includes performing the following steps through the processor:

- obtaining the required data from the 2D images captured by the different photographic equipment by the data collection module;
- learning the ability of reconstructing and rendering 3D models and scenes from the required data by utilizing deep neural architecture of the model training module, including performing training on the 3D modeling model of the model training module using the required data;
- converting the required data into the 3D models and scenes using the 3D modeling model that has been trained; and
- producing 3D effects by performing rendering and post-production on the generated 3D models and scenes through the rendering and 3D effect module.

In one preferred embodiment, the required data is obtained from the 2D images captured by the different photographic equipment, including videos captured by ordinary mobile phones, multiple consecutive photos or a continuous video from different angles captured by professional photography equipment.

In one preferred embodiment, the three-dimensional (3D) model reconstruction and rendering apparatus further includes providing high-resolution reconstruction of the generated 3D models and scenes by the high-resolution reconstruction module.

BRIEF DESCRIPTION OF THE DRAWINGS

The components, characteristics and advantages of the present invention may be understood by the detailed descriptions of the preferred embodiments outlined in the specification and the drawings attached.

DETAILED DESCRIPTION

Figure 1:
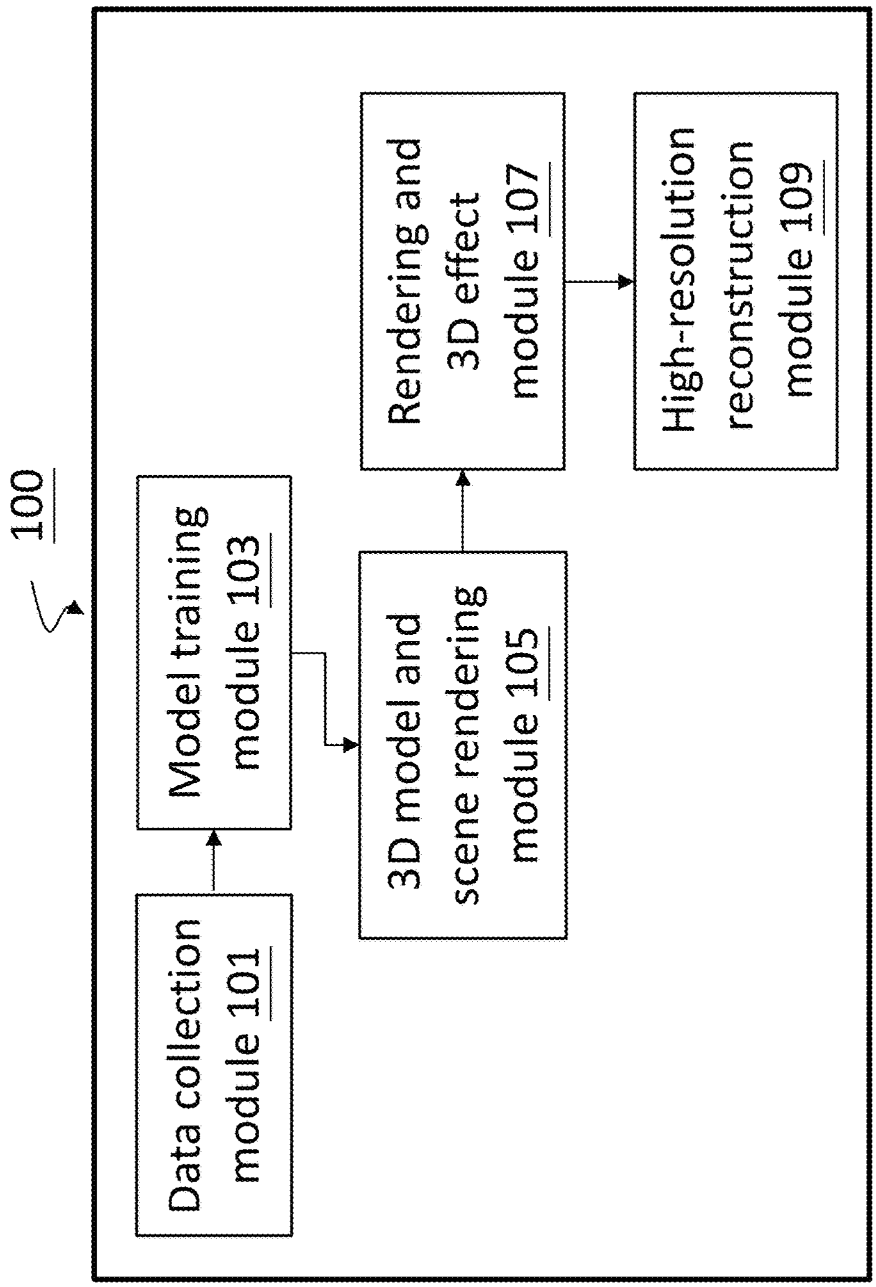
FIG. 1 shows a device for three-dimensional (3D) model reconstruction and rendering according to an embodiment of the present invention.

Some preferred embodiments of the present invention will now be described in greater detail. However, it should be recognized that the preferred embodiments of the present invention are provided for illustration rather than limiting the present invention. In addition, the present invention can be practiced in a wide range of other embodiments besides those explicitly described, and the scope of the present invention is not expressly limited except as specified in the accompanying claims.

The present invention aims to solve the problem that traditional 3D model reconstruction and scene rendering techniques usually require a large amount of computing resources and professional knowledge and are difficult to process high-resolution and large-scale data while being applied to realistic application scenarios. For this purpose, an efficient 3D model reconstruction device and rendering method based on Neural Radiance Fields (NeRF) and Gaussian Splatting technologies are proposed. Through advanced neural network architecture and optimization algorithms, the proposed 3D model reconstruction and rendering device and related method can be used to quickly and accurately reconstruct high-quality and high-resolution 3D models and scenes from mobile phone videos, multiple consecutive photos or a continuous video from different angles taken with professional photography equipment. In addition, the present invention also provides a method to perform rendering and post-production processes on the generated 3D models and scenes through currently available 3D modeling and rendering software (such as Blender b3d, Maya and Unreal Engine), so as to facilitate practical applications in the field of entertainment, movies and e-commerce.

The 3D model reconstruction and rendering device 100 proposed by the present invention, with reference to FIG. 1, which mainly includes: a data collection module 101, which is used to collect videos taken by mobile phone and multiple consecutive photos or a continuous video from different angle taken by a professional photography equipment, and to obtain the required data from them, these data will be used to subsequently train the 3D model and learn the ability of reconstructing and rendering the 3D models and scenes; a model training module 103, which uses advanced neural network architecture and optimization algorithms, including neural radiation field (NeRF) and Gaussian splattering algorithms and other related 3D modeling models, to learn the ability of reconstructing and rendering 3D models and scenes from the collected data (required data), to train the 3D modeling models through continuous learning and optimization, and the 3D modeling models that has been trained can generate high-quality and high-resolution 3D models and scenes; a 3D model and scene rendering module 105, which uses the 3D modeling model (installed insider the model training module 103) that has been trained to convert the collected data into high-quality and high-resolution 3D models and scenes, the generated 3D models and scenes can be directly used in the fields of entertainment, movies and e-commerce and can also be processed through mainstream 3D modeling and rendering software (such as Blender b3d, Maya and Unreal Engine) for further applications; a rendering and 3D effect module 107, which is used to perform processing and post-production on the generated 3D models and scenes through the mainstream 3D modeling and rendering software (such as Blender b3d, Maya and Unreal Engine), so that various effects and animations can be produced to achieve better visual effects and realism; and a high-resolution reconstruction module 109, which is used to produce high-resolution reconstruction from the generated 3D models and scenes, and can reconstruct a 3D model with a resolution of up to 4K to meet the needs of high-resolution visual effects. All the aforementioned modules can be represented in program codes and are stored in the storage device 424, can be calculated and accessed through the processor 414.

According to an embodiment of the present invention, the 3D modeling model for training includes Neural Radiation Field (NeRF) and Gaussian Splattering algorithms. High-quality 3D models, including characters/objects and scenes, can be reconstructed from multi-view 2D images by performing the operations including calculations and modeling based on the Neural Radiation Field (NeRF) algorithm. Improved rendering effects can be achieved through performing operations, including calculations, based on the Gaussian Splatting algorithm.

According to an embodiment of the present invention, the Neural Radiance Field (NeRF) technology is a neural network architecture for 3D scene reconstruction, which can learn a continuous neural network by using a deep neural network, used to reconstruct high-quality 3D models from multi-view 2D images. NeRF takes three-dimensional coordinates and viewing angles as inputs, and outputs the color and density of the position through the neural network, thereby rendering a new viewing angle image.

According to an embodiment of the present invention, the Gaussian splattering technology is a rendering technology in 3D modeling based on point cloud, which can project each point onto the image plane and use Gaussian function to render each point to generate a continuous image. Gaussian splattering technology can help improving rendering effects in the scenario of applying NeRF, especially in the case of dealing with 3D scenes with complex geometries and details.

According to some embodiments of the present invention, the model training module 103 utilizes ordinary mobile phone videos, a plurality of continuous photos or a continuous video at different angles taken by professional photography equipment, as the training materials to train the NeRF and Gaussian splattering algorithms of the training module 103, i.e. to train the 3D modeling model, and to optimize the modeling parameters of the 3D modeling model by performing minimal reconstruction error and rendering, enabling that the model training module 103 can learn the ability of reconstructing and rendering 3D models and scenes from the collected data.

According to some embodiments of the present invention, the model training module 103 can be used to evaluate the performance of the NeRF and Gaussian Splattering algorithms that have been trained in rendering new perspective images and reconstructing 3D models, and can also be used to perform parameter adjustments and model fine-tuning as needed.

Figure 2:
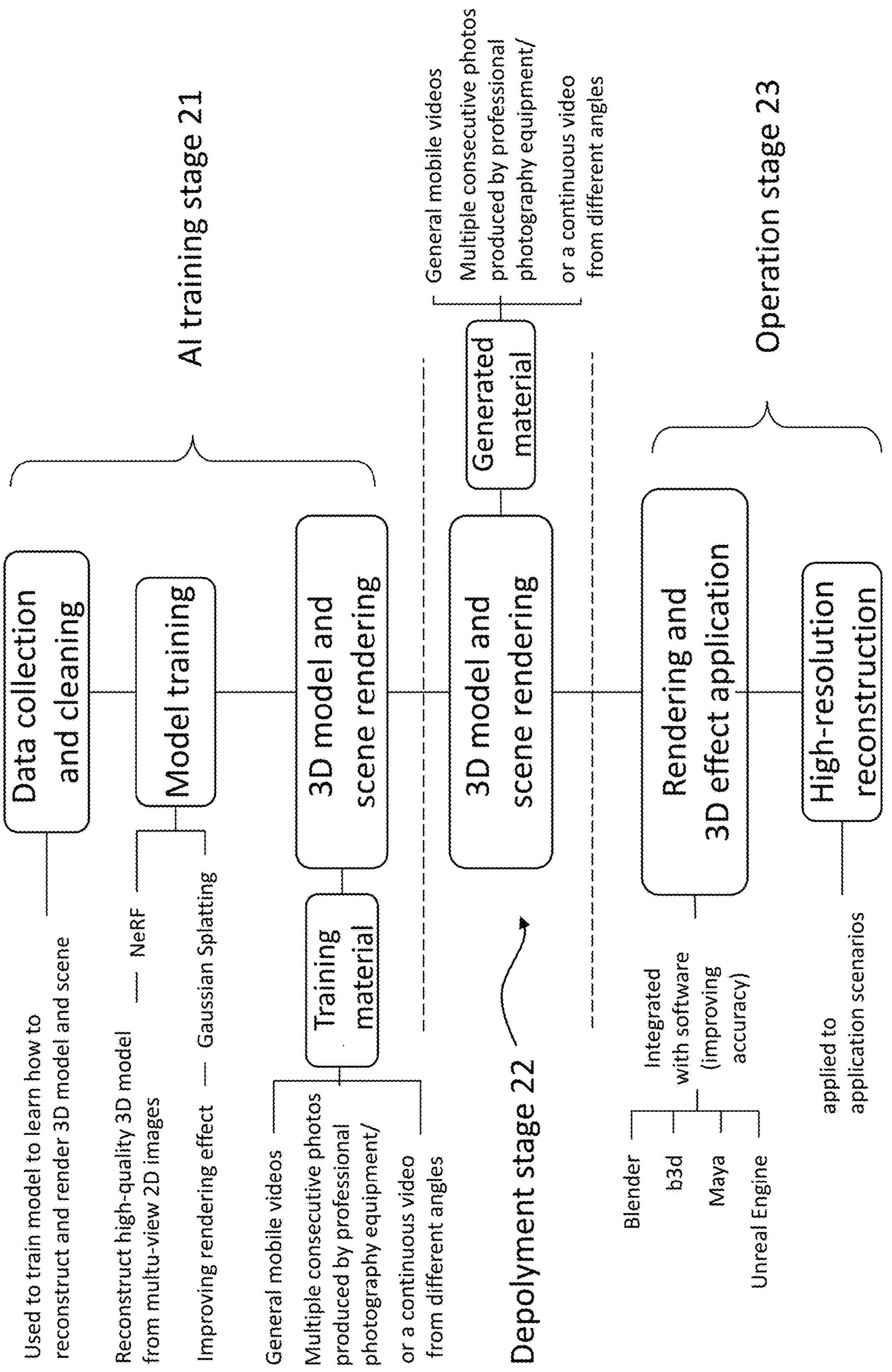
FIG. 2 depicts a schematic diagram showing the different implementation stages of the present invention utilizing a 3D model reconstruction and rendering device to realize three-dimensional model reconstruction and rendering.
Figure 3:
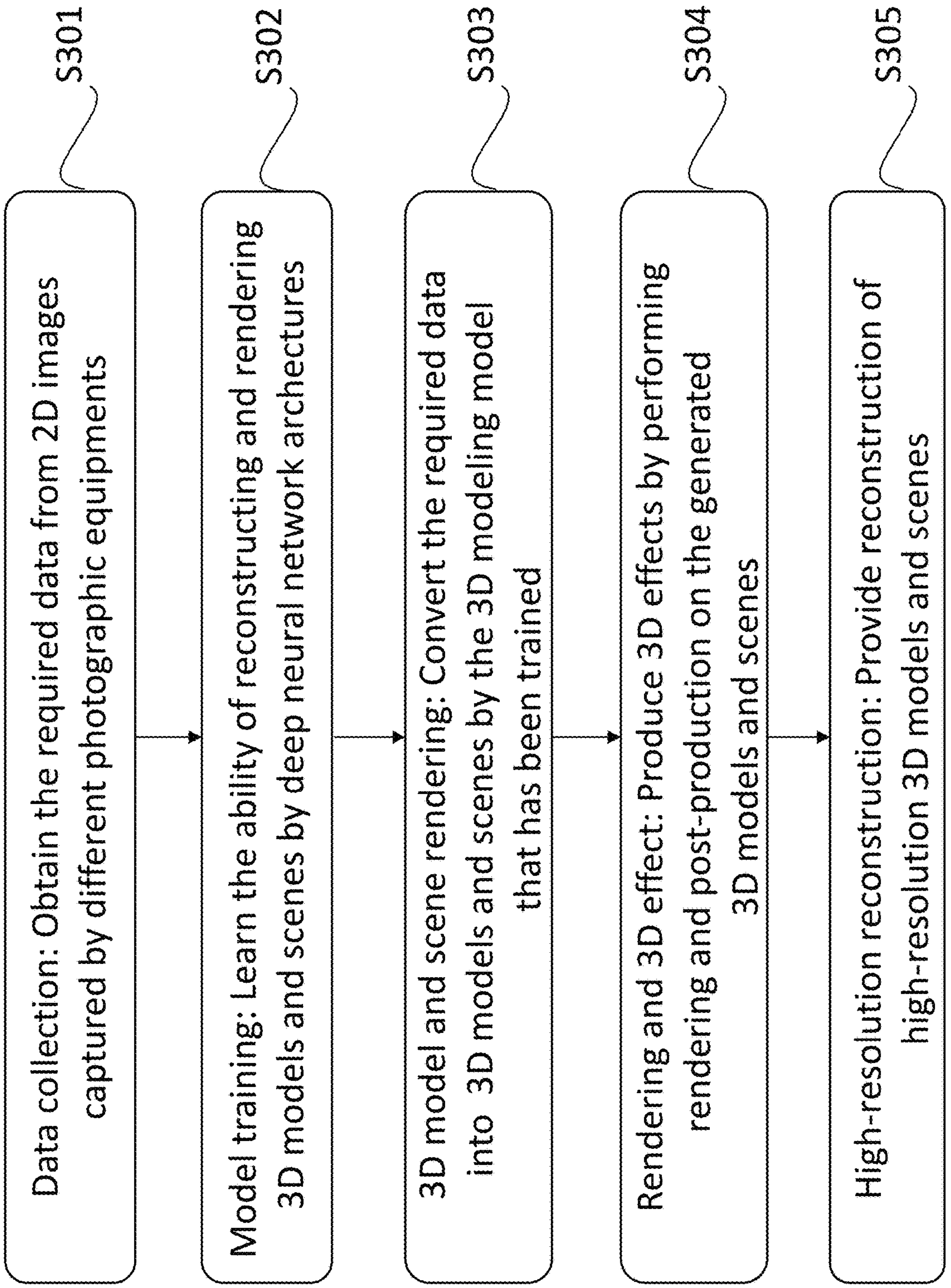
FIG. 3 shows an embodiment of the 3D model reconstruction and rendering device proposed by the present invention, which is used to realize the implementation process of reconstructing and rendering three-dimensional models and scenes.

FIGS. 2-3 show the implementation process of using the 3D model reconstruction and rendering device 100 to realize 3D model reconstruction and rendering according to embodiments of the present invention. Referring to FIG. 2, the artificial intelligence (AI) training stage (model training stage) 21 is first performed. At this stage, videos captured by mobile phones, multiple consecutive photos or a continuous video from different angles taken by professional photography equipment are collected by the data collection module 101 (see FIG. 1), which are cleaned, formatted and labeled and are used as training data for training the NeRF and Gaussian splattering algorithms of the model training module 103 (see FIG. 1), i.e., used to train 3D modeling model. The training of the 3D modeling model includes the training process of multiple iterations, so that the 3D modeling model can learn the ability of reconstructing and rendering 3D models and scenes from the collected data. Next, the 3D model and scene rendering module 105 (see FIG. 1) uses the 3D three-dimensional modeling model that has been trained to convert the collected data into high-quality and high-resolution three-dimensional models and scenes.

Next, in the deployment stage 22, the 3D modeling model that has been trained is used to convert the collected data into 3D models and scenes through the 3D model and scene rendering module 105 (see FIG. 1), and can generate materials, including videos taken by ordinary mobile phones, multiple consecutive photos or a continuous video from different angles taken by professional photography equipment, which are retained as resources to provide material for subsequent use.

Subsequently, in the operation stage 23, the rendering and 3D effect module 107 (see FIG. 1) is used to produce animations, 3D effects, etc., by performing rendering and post-production on the generated 3D models and scenes through 3D modeling and rendering software (for example, Blender b3d, Maya and Unreal Engine), which is conducive to actual application scenarios, and the high-resolution reconstruction module 109 (see FIG. 1) can be further used to reconstruct the generated 3D models and scenes with high resolution.

FIG. 3 shows an embodiment of a 3D model reconstruction and rendering device 100 proposed by the present invention. The implementation process for reconstructing and rendering 3D models and scenes includes executing the following steps through the processor 414 (refer to FIG. 4): step S301, data collection stage: obtain the required data from 2D images taken by different photographic equipment, including videos taken by ordinary mobile phones, multiple consecutive photos or a continuous video from different angles taken with professional photography equipment by utilizing the data collection module 101 (refer to FIG. 1); step S302, model training: learn the ability of reconstructing and rendering 3D models and scenes from the collected data by using the deep neural network architecture of the model training module 103 (refer to FIG. 1), including using the collected data to train the 3D modeling module of the training module 103 (refer to FIG. 1); step S303, 3D model and scene rendering: convert the collected data into 3D models and scenes through the 3D model and scene rendering module 105 (refer to FIG. 1) that has been trained; step S304, rendering and 3D effect: produce 3D effects by performing rendering and post-production on the generated 3D models and scenes using 3D modeling and rendering software of the rendering and 3D effect module 107 (refer to FIG. 1); step S305, high-resolution reconstruction: provide reconstruction of high-resolution 3D models and scenes by further utilizing the high-resolution reconstruction module 109 (refer to FIG. 1). All the aforementioned modules can be represented in program codes and are all stored in the storage device 424 (see FIG. 4) and can be accessed through the processor 414 to perform operations.

The following paragraphs provide examples of specific implementations:

Example 1: Film Production

In this example, the goal is to utilize the technology provided by the present invention to reconstruct and render real-world scenes and objects for use in film production. The specific way to reconstruct and render real-world scenes and objects follows the following steps:

(1) Data collection: Collect visual data of the target scene or object from multiple consecutive photos or a continuous video from different angles captured by ordinary mobile phones and/or professional photography equipment.

(2) Model training and reconstruction: Train the model from the collected data and reconstruct the 3D model of the target scenes or objects by using the technology based on NeRF and Gaussian Splatting.

(3) Rendering and post-production: Integrate the reconstructed 3D model with other film elements and perform rendering and post-production by using software such as Blender, Maya or Unreal Splatting to achieve the required visual effects.

Example 2: E-Commerce

In this example, the goal is to use the technology provided by the present invention to reconstruct and render a 3D model of the product to facilitate display on the e-commerce platform. The specific method of reconstructing and rendering the 3D model of the product follows the following steps:

(1) Data collection: Capture multi-angle photos or videos of the product using different photographic equipment.

(2) Model training and reconstruction: Train the model from the collected data and reconstruct the three-dimensional model of the product using technology based on NeRF and Gaussian Splatting.

(3) Rendering and post-production: Render the reconstructed 3D model into high-quality images or animations and display them on the e-commerce platform, so that consumers can view the products from different angles to get a better shopping experience.

The above examples show the application potential and value of the present invention in different fields. In film production, the technology provided by the present invention can help producers to create real-world 3D scenes and objects with more faster pace and at lower cost; and in e-commerce, the technology provided by the present invention can offer consumers with a more intuitive and interactive experiences for product exhibition.

Figure 4:
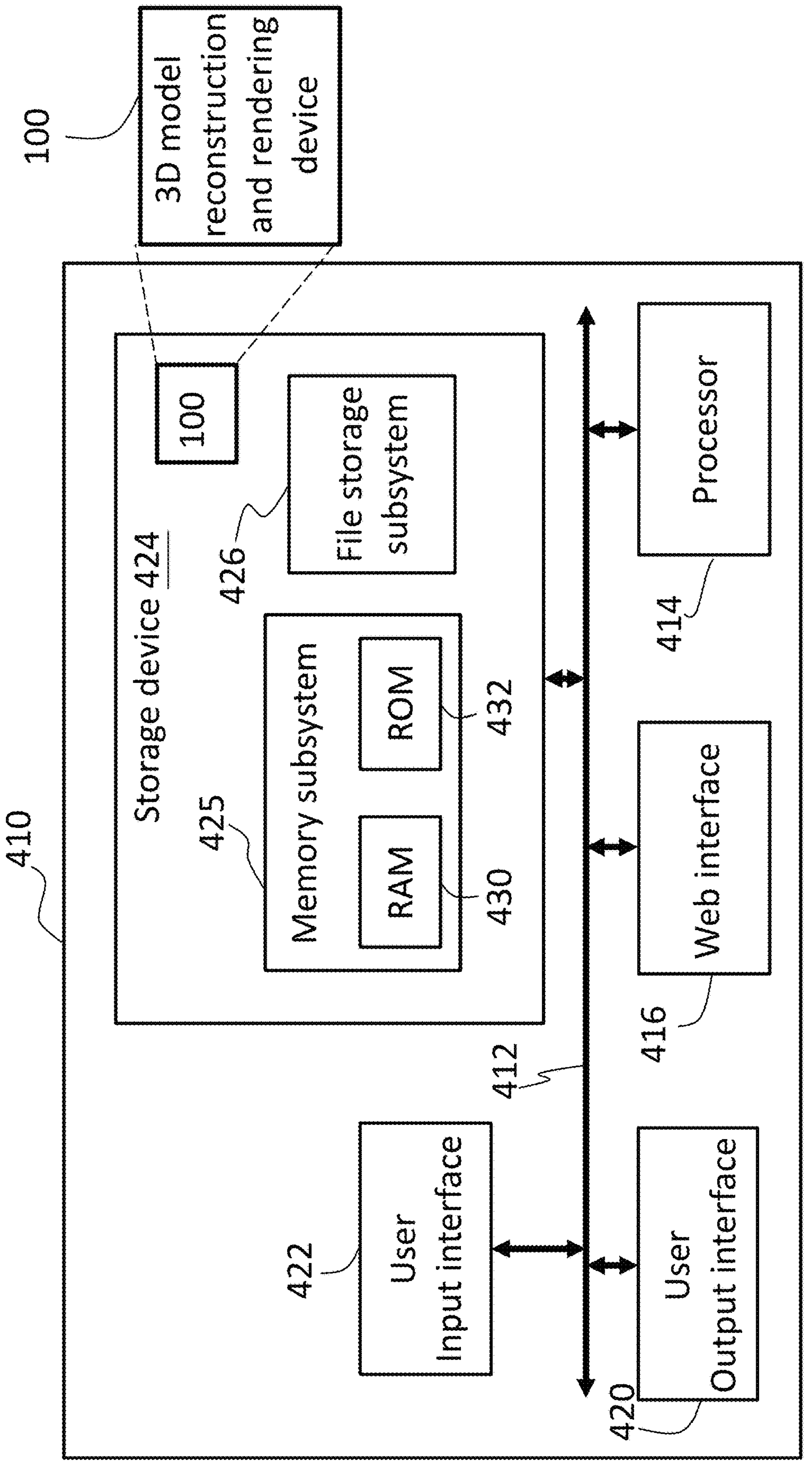
FIG. 4 shows a functional block diagram of an exemplary computer system/server for implementing embodiments of the present invention.

For example, the device 100 that performs operations, calculation programs, and three-dimensional model reconstruction and rendering shown in FIGS. 1-3, The above methods or embodiments proposed by the present invention can be executed in a server or similar computer system. For example, the 3D model reconstruction and rendering device 100 that performs operations, calculation programs, and 3D model reconstruction and rendering shown in FIGS. 1-3, can be executed through the processor 414 to process the required information and can be stored in the storage device 424. The 3D model reconstruction and rendering device 100 proposed by the present invention (refer to FIG. 1), which exists in a server or similar computer system 410 as shown in FIG. 4. Functional block diagram of the server or similar computer system 410 is illustrated in FIG. 4. It should be emphasized that the server/computer system shown in FIG. 4 is only used as an example and should not impose any limitations on the embodiments and scope of usages of the present invention.

As shown in FIG. 4, the server/computer system 410 is in the form of a general computing device. Server/computer system 410 typically includes at least one processor 414 that is communicatively connected to a plurality of peripheral devices through bus subsystem 412. These peripheral devices may include storage devices (e.g., memory subsystem 425 and file storage subsystem 426) 424, user output interface 420, user input interface 422, and network interface subsystem 416. The network interface subsystem 416 provides a connection interface to the external network and is coupled to corresponding interface devices of other computing devices.

According to embodiments of the present invention, the processor 414 may include a multi-core central processing unit (CPU), a graphics processor unit (GPU), a digital signal processor (DSP), an application specific integrated circuit (ASIC), or their combinations, etc.

User input interface 422 may interface with input devices including keyboard, pointing device such as mice, trackball, trackpad or graphics tablet, scanner, touch screen integrated into display, voice input device such as speech recognition system, microphone, and other types of input devices, etc.

User output interface 420 may interface with output devices including a display subsystem, a printer, a fax machine, or a non-visual display such as a sound output device. The display subsystem may include a cathode ray tube display (CRT), a flat panel device such as a liquid crystal display (LCD), a projection device, or other mechanism for producing visual images. The display subsystem may also provide non-visual displays by sound output devices.

Storage device 424 stores programming and data constructs that provide functionality for some or all modules described in the present invention. For example, a program or program module stored in the storage device may be configured to perform the functions of various embodiments of the invention. The aforementioned programs or program modules may be executed by the processor alone or in combination with other processors.

The memory subsystem 425 in the storage device 424 can include a plurality of memories, including a main random access memory (RAM) 430 for storing instructions and data during program execution, and a read-only storage memory (ROM) 432 for storing fixed instructions. File storage subsystem 426 provides persistent storage for program and data files and may include hard drives, optical drives, or removable media cartridges. Functional modules for implementing certain embodiments may be stored in storage device 424 via file storage subsystem 426, or in other machines that can be retrieved/accessed by one or more processors.

The bus subsystem 412 provides a mechanism so that various components and subsystems of the computing device/device can communicate with each other in an expected manner. Although bus subsystem 412 is illustratively presented as a single bus, alternative implementations of bus subsystem 412 may use multiple buses.

Computing device may be of various types, including workstation, server, computing cluster, or other data processing system or computing device.

The device and method for 3D model reconstruction and rendering proposed by the present invention have the following advantages:

(1) High-quality 3D reconstruction: High-quality 3D models and scenes can be reconstructed from a small number of two-dimensional (2D) images through the combination of NeRF and Gaussian Splatting algorithms.

(2) Efficient rendering performance: New perspective images can be efficiently rendered while retaining the details and geometric characteristics of the original 3D scene by using rendering technology provided by Gaussian Splatting.

(3) Flexible applicability: The generated 3D models and scenes can be easily processed through other 3D modeling and rendering software (such as Blender b3d, Maya and Unreal Engine) to produce 3D effects and animations etc. for easy usage in various application scenarios.

Compared with traditional 3D reconstruction and rendering technology, the device and method for 3D model reconstruction and rendering provided by the present invention are based on NeRF and Gaussian Splatting technologies, which can provide higher reconstruction quality and rendering efficiency. Particularly, it has obvious advantages over thew traditional one when dealing with high-resolution and large-scale 3D scenes.

The present invention provides an advanced device and method based on NeRF and Gaussian Splatting, aiming at the reconstruction and rendering of 3D models. By combining these two technologies, the present invention provides the ability of quickly and efficiently reconstructing high-quality and highly realistic 3D models from 2D images and rendering them in detail. The present invention not only provides a powerful and integrated framework for capturing and rendering high-quality 3D scenes from a small number of 2D images, but also ensures their fidelity in real-world environments. The device and method provided by the present invention have broad application prospects in the entertainment and e-commerce industries, can bring a more immersive experience to users, and provide more vivid and realistic product displays for further promoting the innovation and development of these two industries.

While various embodiments of the present invention have been described above, it should be understood that they have been presented by a way of example and not limitation. Numerous modifications and variations within the scope of the invention are possible. The present invention should only be defined in accordance with the following claims and their equivalents.

What is claimed is:

1. A three-dimensional (3D) model reconstruction and rendering apparatus, comprising:

a processor;

a storage device coupled to said processor;

a data collection module, stored in said storage device and accessible through said processor, configured to obtain required data from two-dimensional (2D) images captured by different photographic equipment;

a model training module, stored in said storage device and accessible through said processor, configured to obtain said required data from said data collection module to train a 3D modeling model and learn the ability of reconstructing and rendering 3D models and scenes;

a 3D model and scene rendering module, stored in said storage device and accessible through said processor, utilizing said 3D modeling model that has been trained to convert said required data into 3D models and scenes; and a rendering and 3D effect module, stored in said storage device and accessible through said processor, configured to performed processing and post-production on the generated 3D models and scenes through a 3D modeling and rendering software;

wherein said 3D modeling model is built in said model training module including a neural radiation field (NeRF) algorithm and a Gaussian Splatting algorithm operating together;

wherein said NeRF algorithm is used to reconstruct 3D models from multi-view 2D images; and wherein said Gaussian splatting algorithm is used to improve rendering effect of said 3D models and scenes.

2. The three-dimensional (3D) model reconstruction and rendering apparatus of claim 1, further including a high-resolution reconstruction module, stored in said storage device and accessible through said processor, configured to produce high-resolution reconstruction from said generated 3D models and scenes.

3. The three-dimensional (3D) model reconstruction and rendering apparatus of claim 2, wherein said high-resolution reconstruction module reconstructs a 3D model with a resolution of up to 4K to meet the needs of high-resolution visual effects.

4. The three-dimensional (3D) model reconstruction and rendering apparatus of claim 1, wherein said 3D models include people, objects, and/or scenes.

5. The three-dimensional (3D) model reconstruction and rendering apparatus of claim 1, wherein said 3D modeling and rendering software comprises Blender, Autodesk Maya, Unreal Engine, or any combination thereof.

6. The three-dimensional (3D) model reconstruction and rendering apparatus of claim 1, wherein said processor includes a multi-core central processing unit (CPU), a graphics processor unit (GPU), a digital signal processor (DSP), an application specific integrated circuit (ASIC), or their combinations.

7. The three-dimensional (3D) model reconstruction and rendering apparatus of claim 2, wherein said 3D model reconstruction and rendering apparatus configured to realize processes for reconstructing and rendering said 3D models and scenes includes performing the following steps through said processor:

obtaining said required data from said 2D images captured by said different photographic equipment by said data collection module;

learning said ability of reconstructing and rendering 3D models and scenes from said required data by utilizing deep neural architecture of said model training module, including performing training on said 3D modeling model of said model training module using said required data;

converting said required data into said 3D models and scenes using said 3D modeling model that has been trained; and producing 3D effects by performing rendering and post-production on said generated 3D models and scenes through said rendering and 3D effect module.

8. The three-dimensional (3D) model reconstruction and rendering apparatus of claim 7, wherein said required data is obtained from said 2D images captured by said different photographic equipment, including videos captured by ordinary mobile phones, multiple consecutive photos or a continuous video from different angles captured by professional photography equipment.

9. The three-dimensional (3D) model reconstruction and rendering apparatus of claim 8, further including providing high-resolution reconstruction of said generated 3D models and scenes by said high-resolution reconstruction module.

* * * * *